Aug. 4, 1925. 1,548,606
C. F. HUTCHINSON
ELECTROMECHANICAL MOVEMENT
Filed Nov. 17, 1923 12 Sheets-Sheet 2
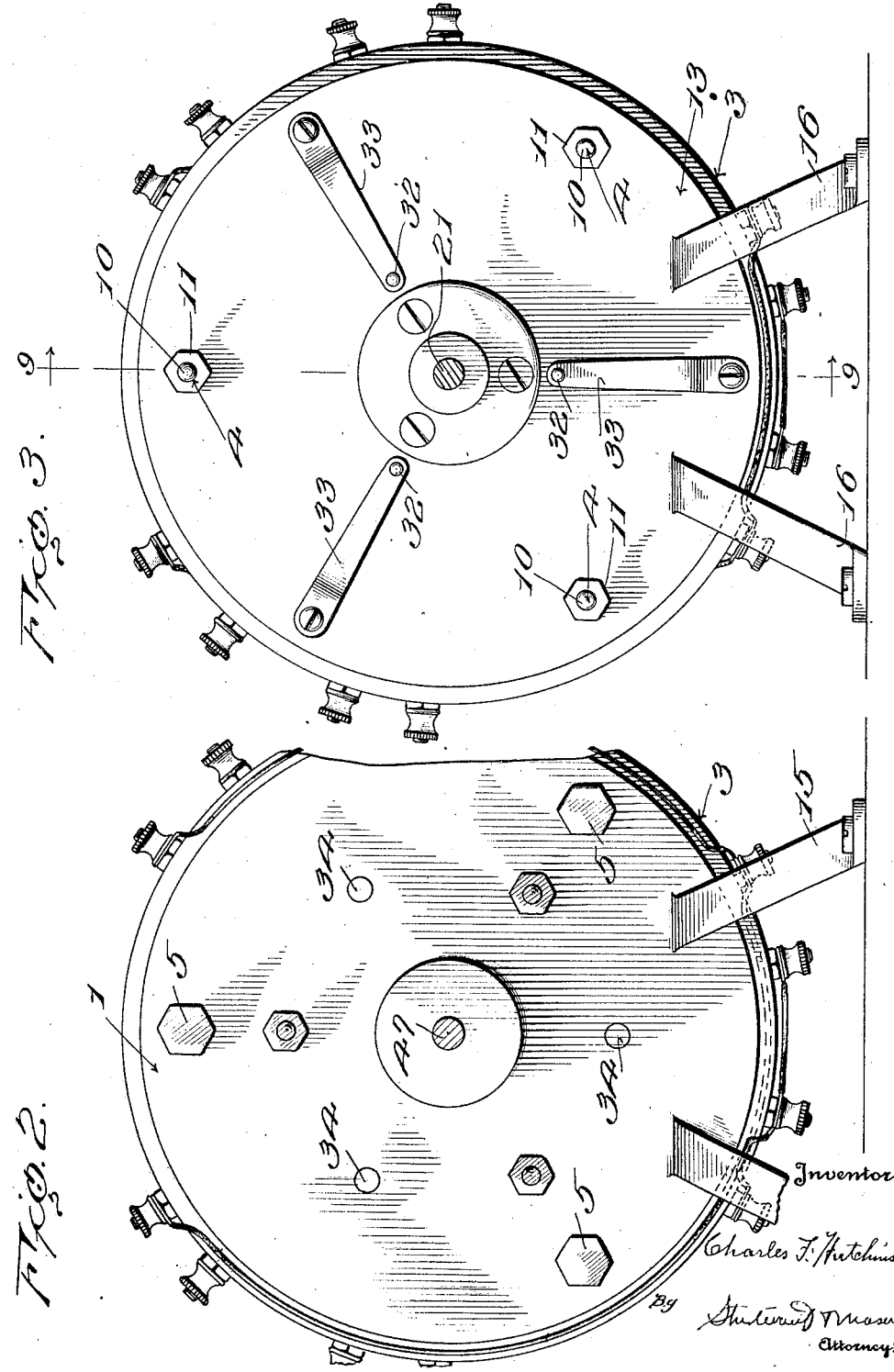

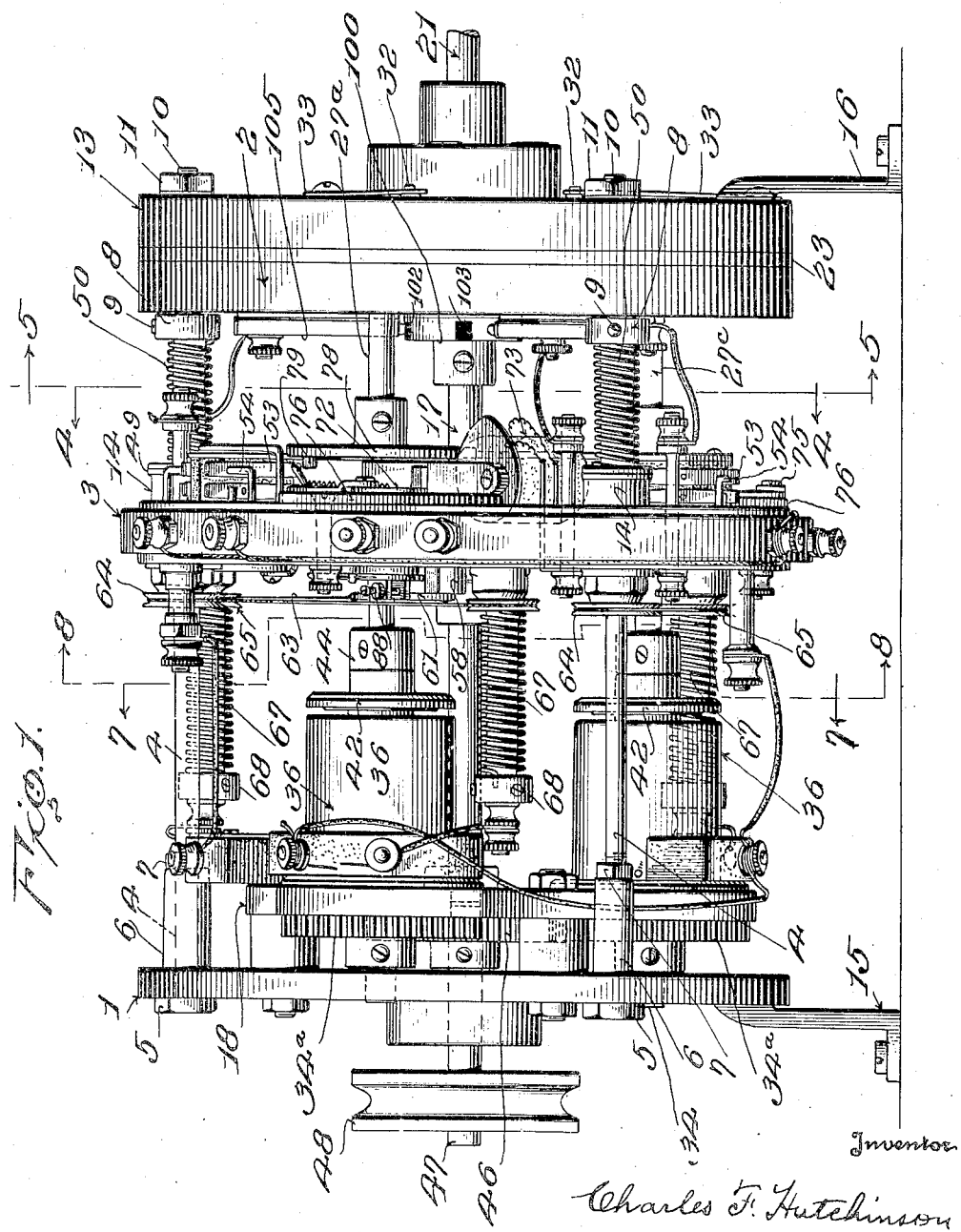

Aug. 4, 1925.
C. F. HUTCHINSON
1,548,606
ELECTROMECHANICAL MOVEMENT
Filed Nov. 17, 1923
12 Sheets-Sheet 3
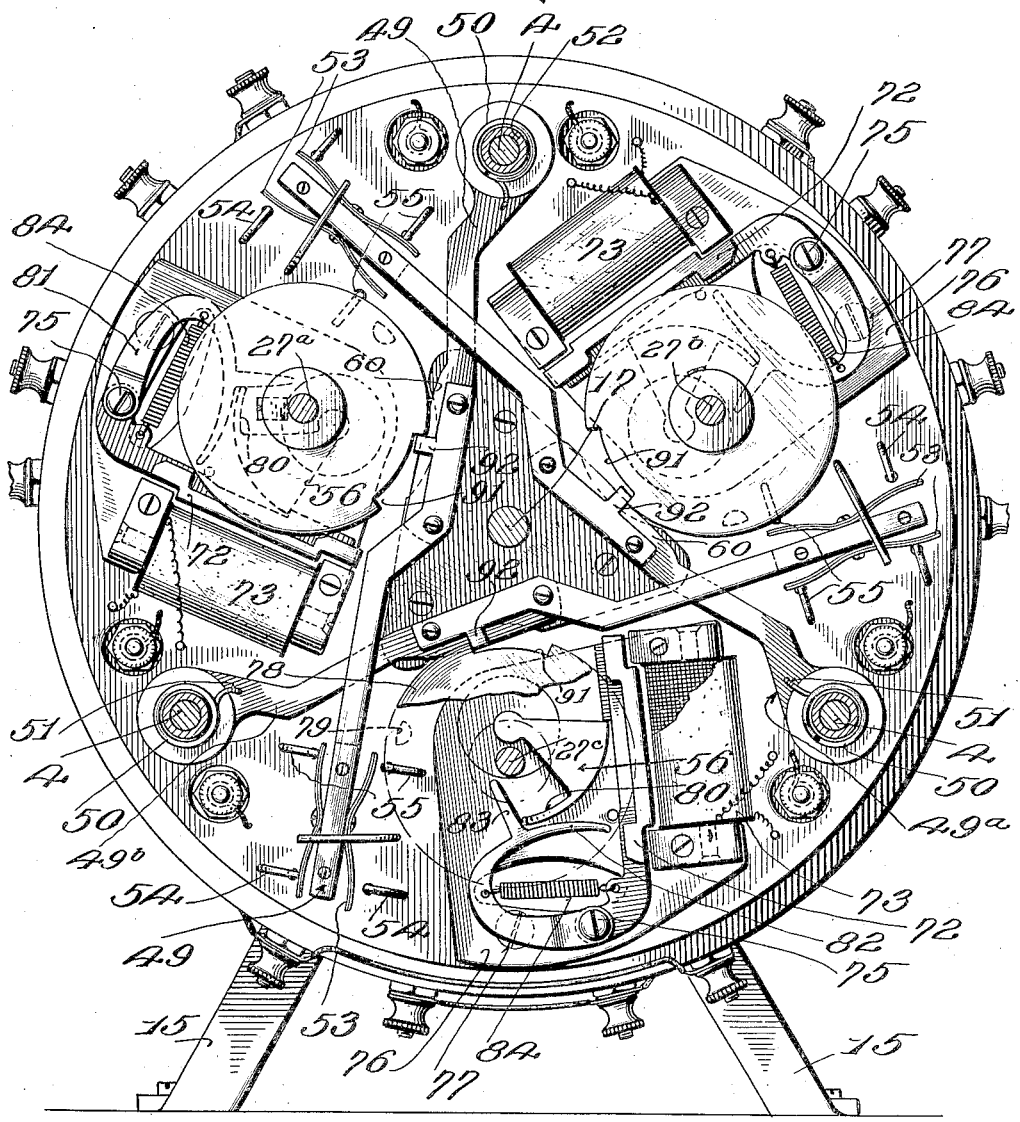
Inventor
Charles F. Hutchinson
By Sturtevant Mason
Attorneys Aug. 4, 1925.
C. F. HUTCHINSON
1,548,606
ELECTROMECHANICAL MOVEMENT
Filed Nov. 17, 1923
12 Sheets-Sheet 4
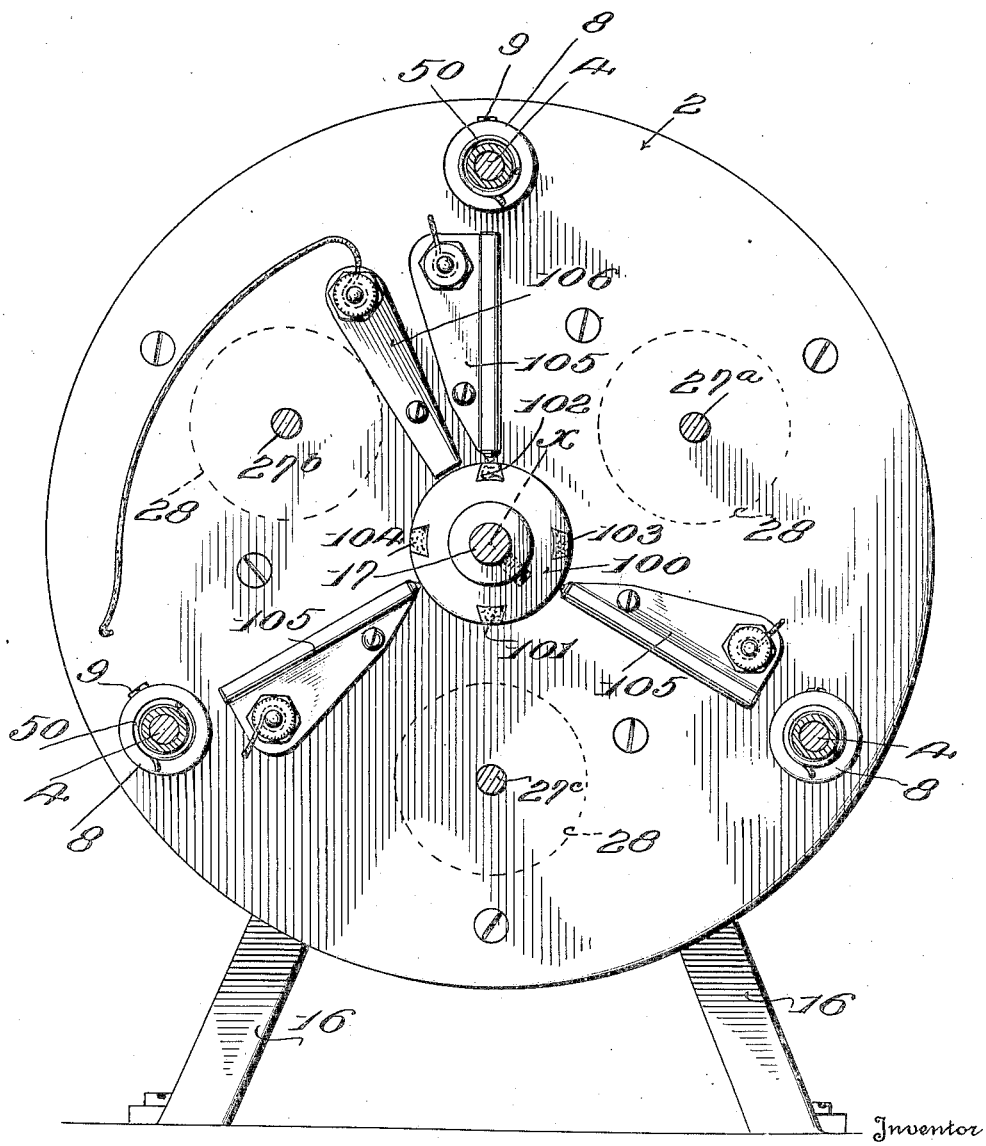

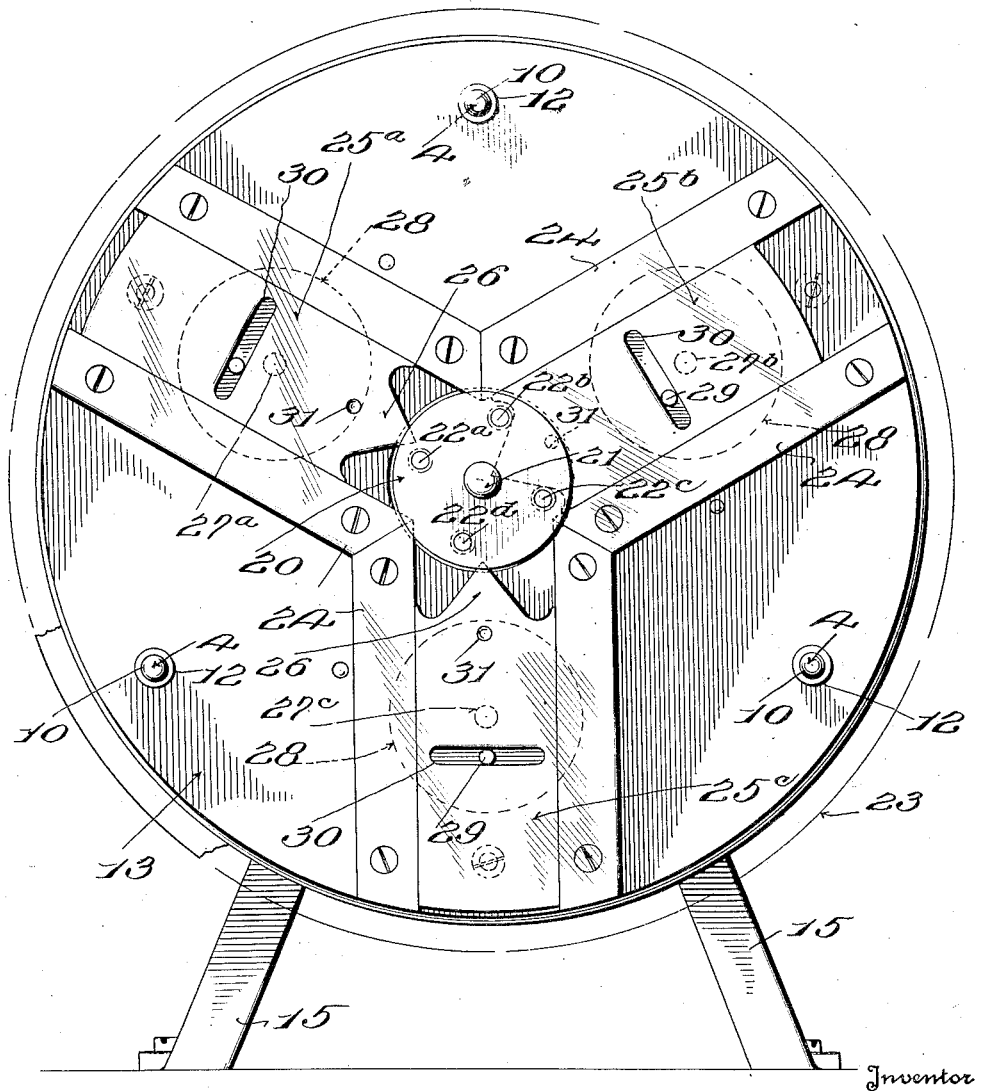

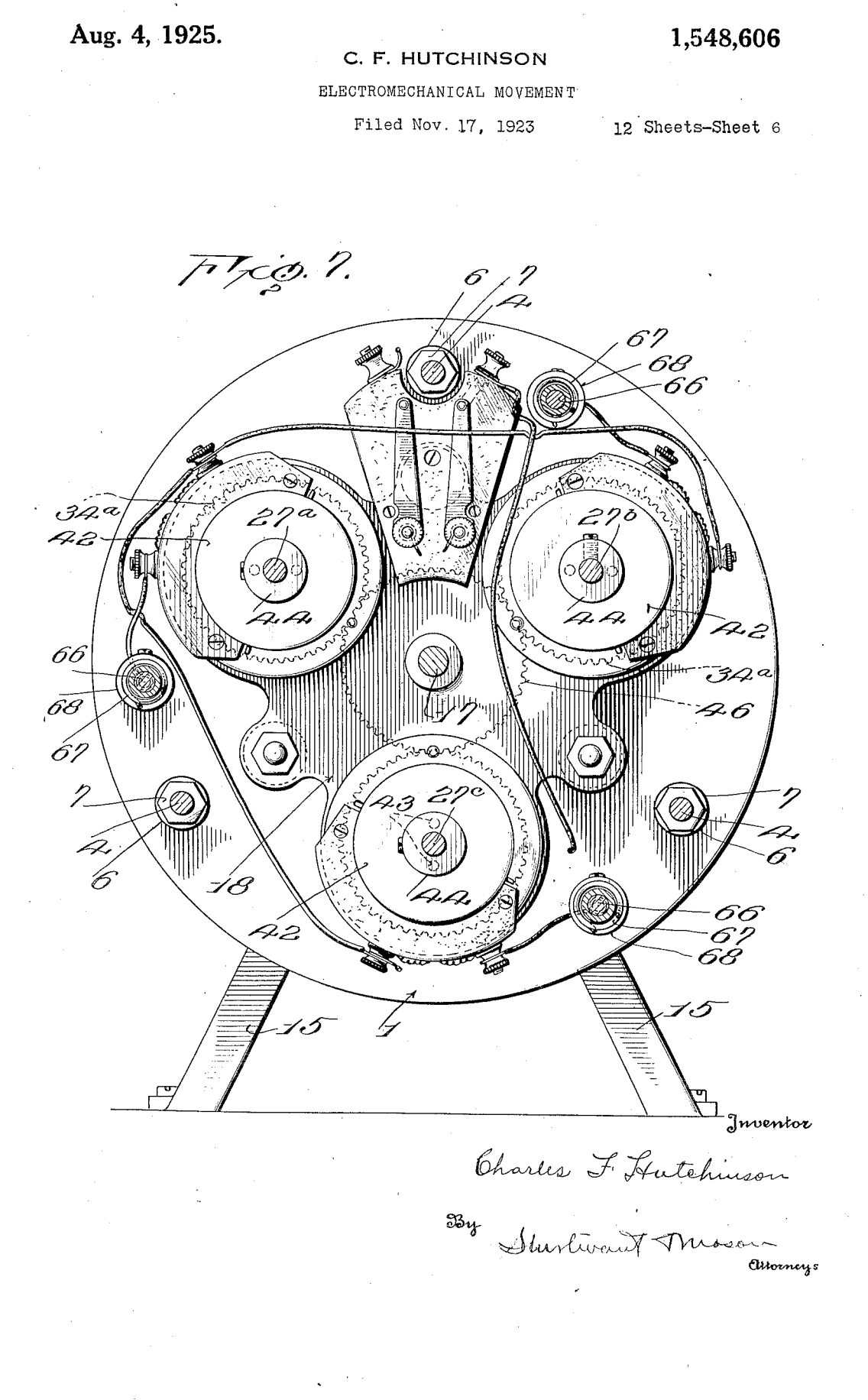

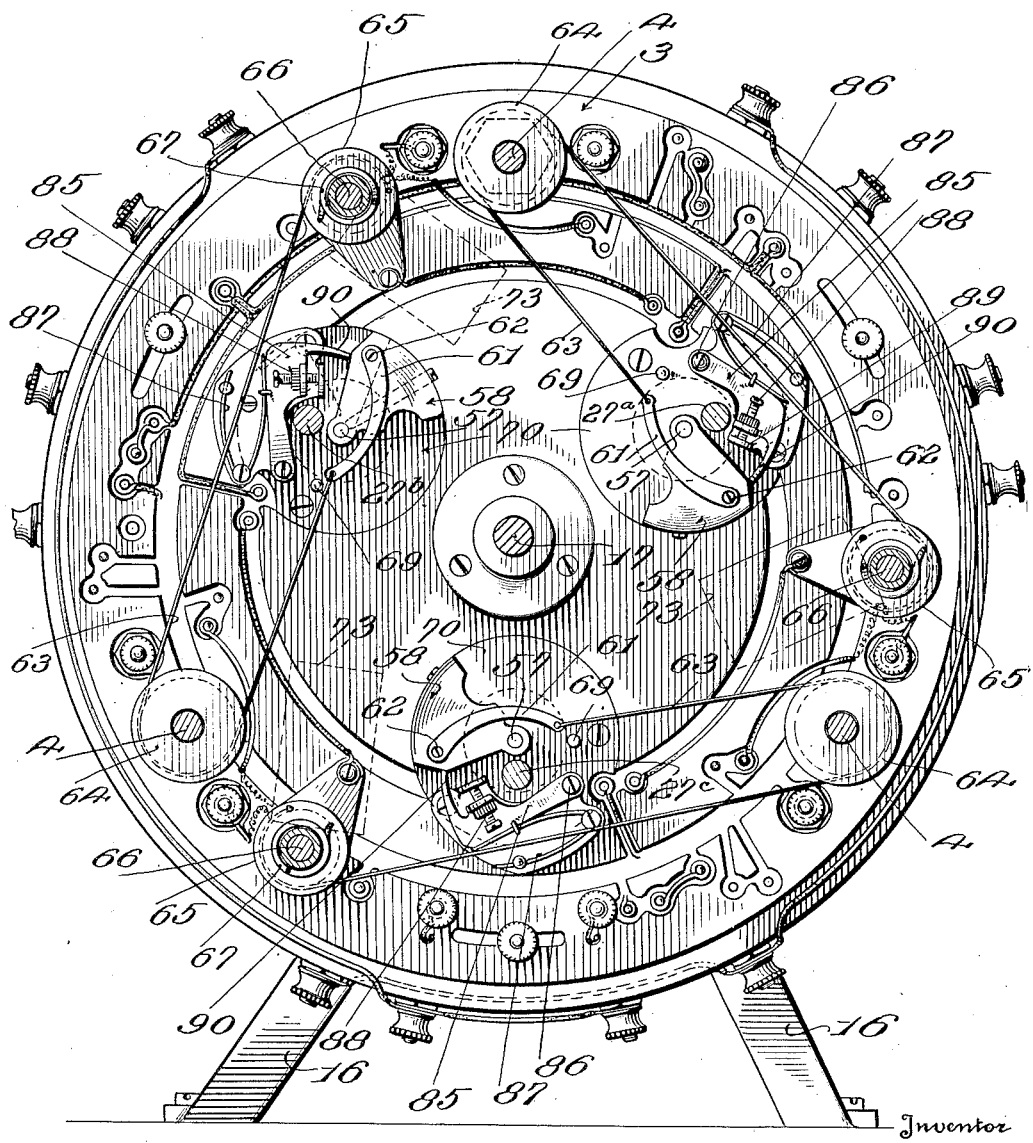

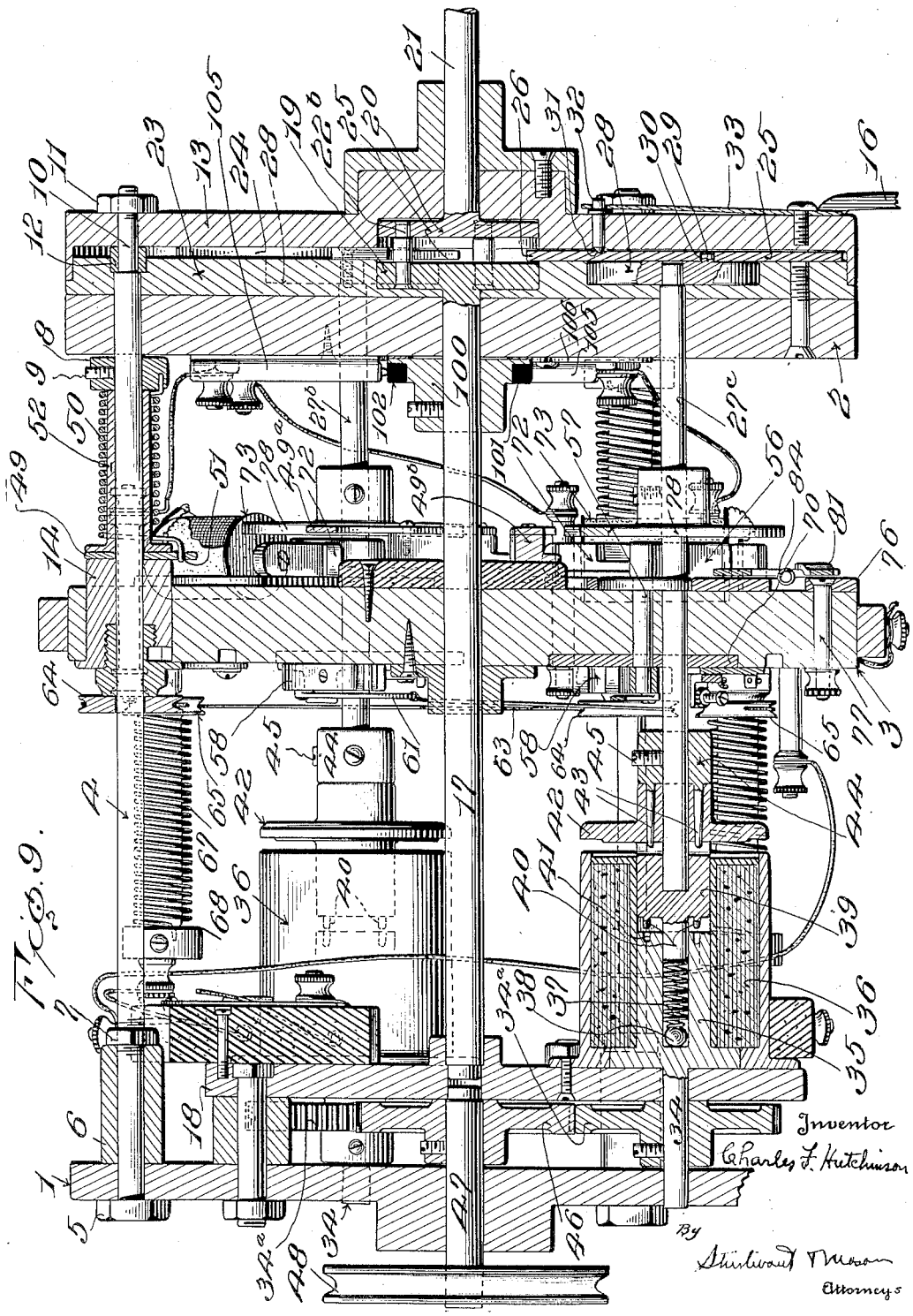

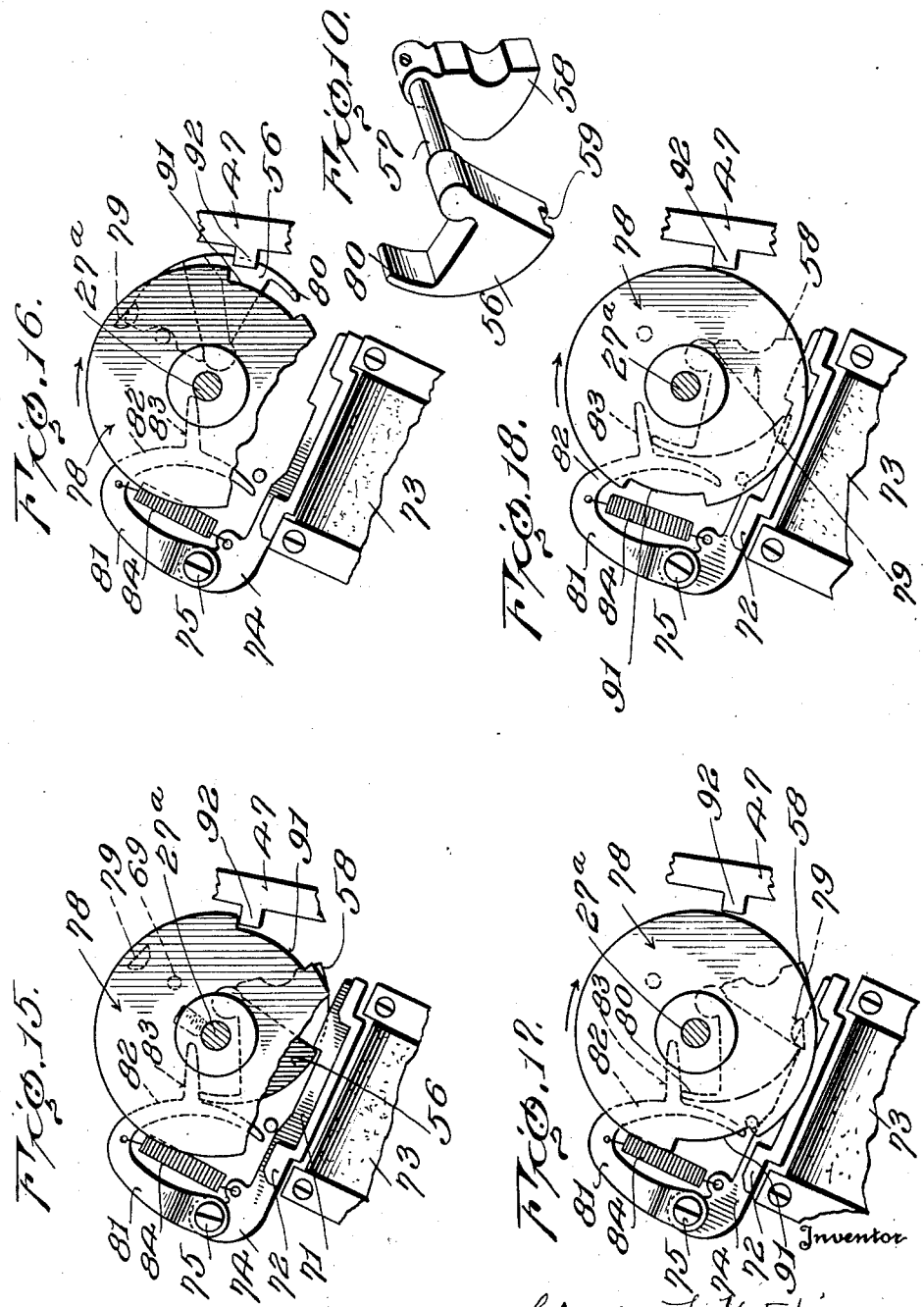

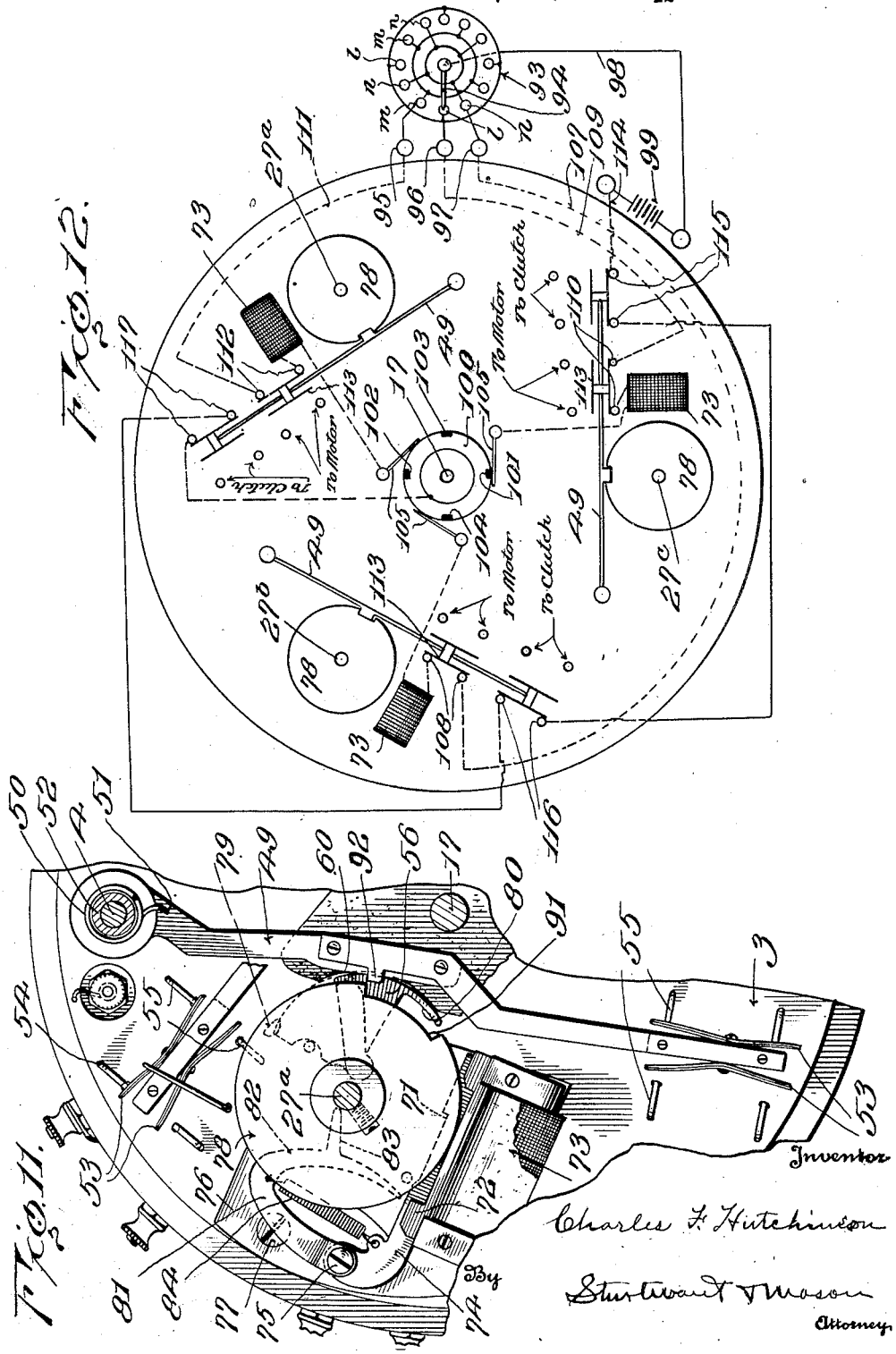

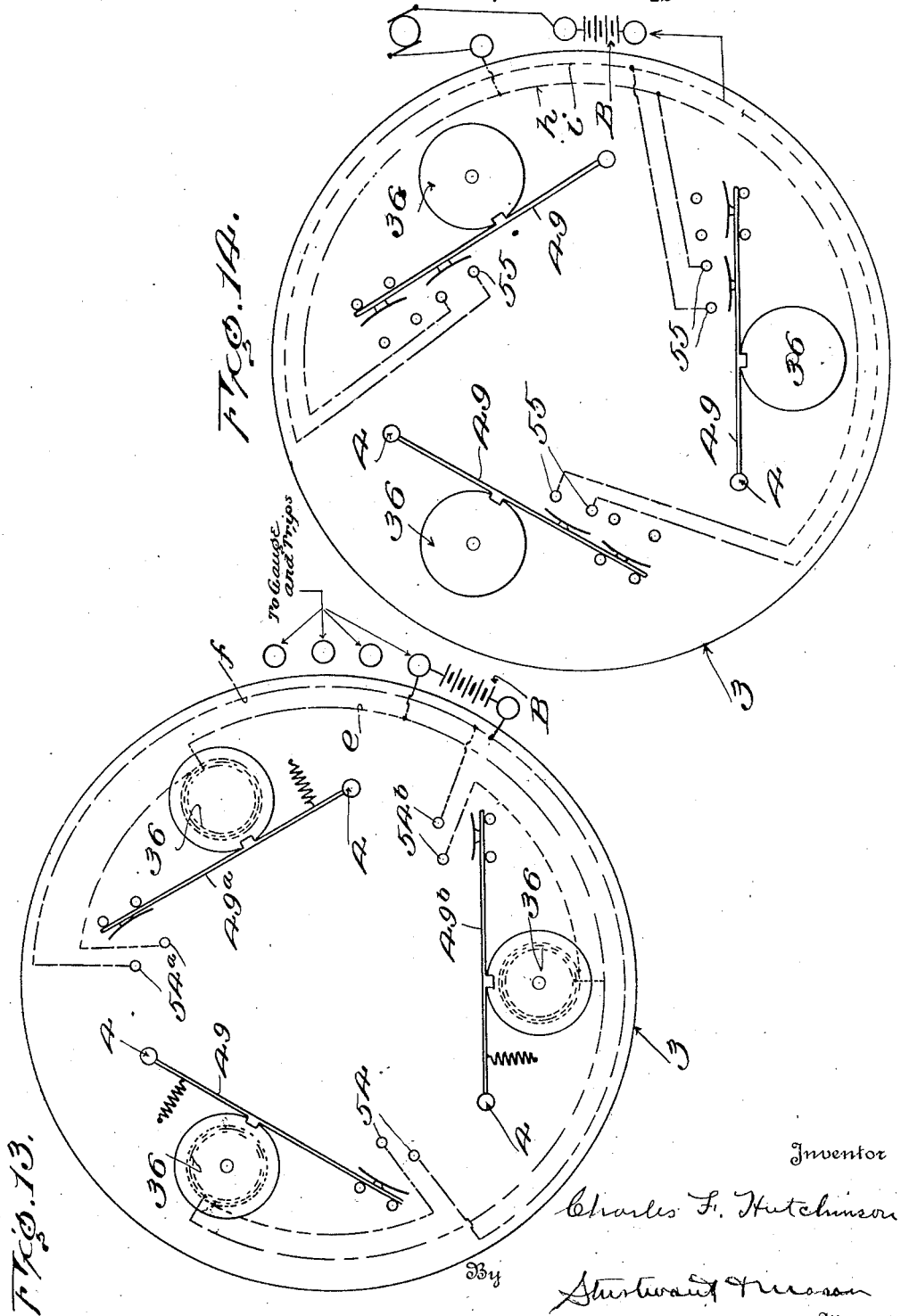

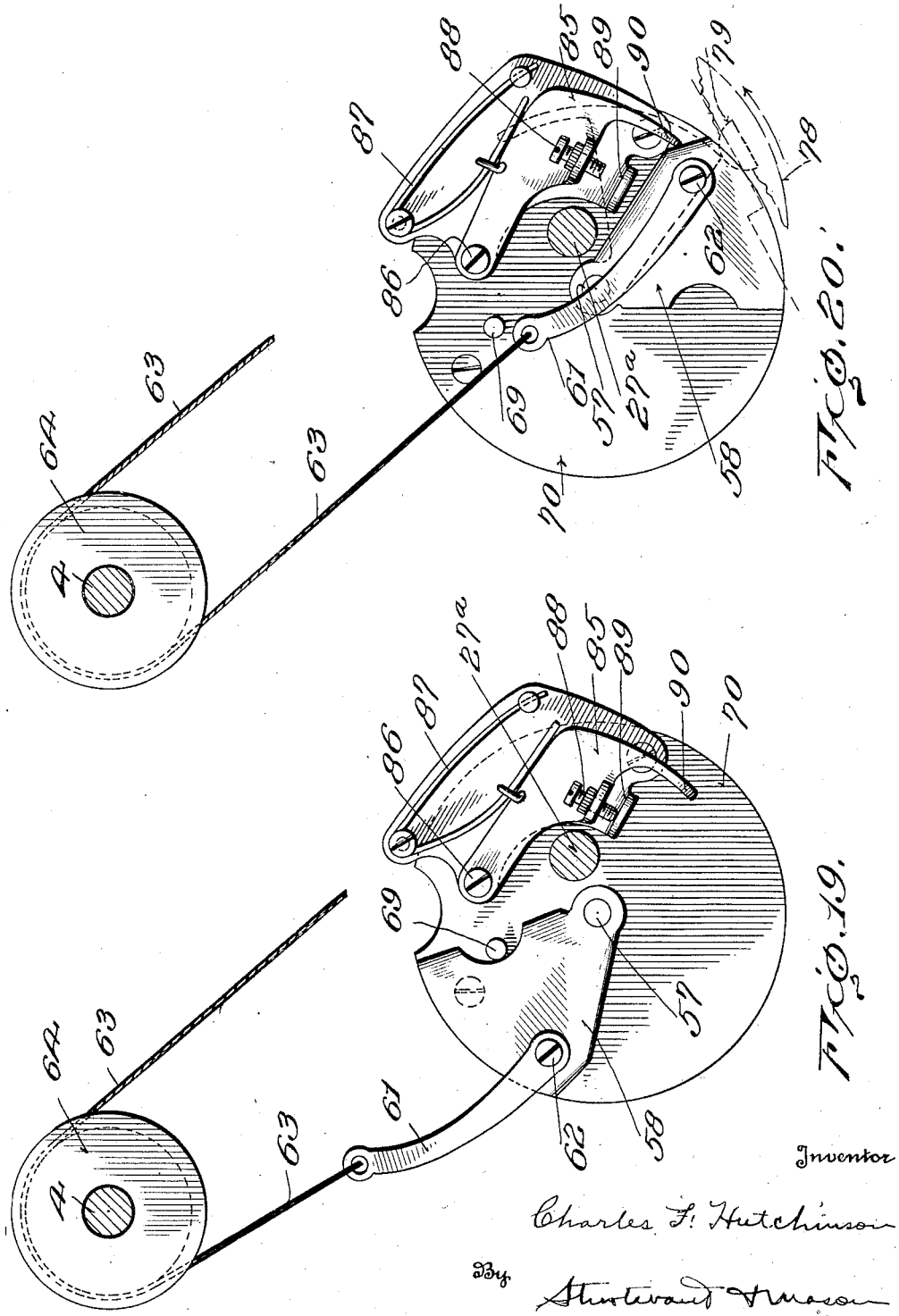

Patented Aug. 4, 1925.

1,548,606

UNITED STATES PATENT OFFICE.

CHARLES F. HUTCHINSON, OF WATERVILLE, MAINE, ASSIGNOR OF ONE-HALF TO ADELBERT A. HUTCHINSON, OF BIRMINGHAM, ALABAMA.

ELECTROMECHANICAL MOVEMENT.

Application filed November 17, 1923. Serial No. 675,433.

*To all whom it may concern:*

Be it known that I, CHARLES F. HUTCHINSON, a citizen of the United States, residing at Waterville, in the county of Kennebec, State of Maine, have invented certain new and useful Improvements in Electromechanical Movements, of which the following is a description, reference being had to the accompanying drawings and to the figures of reference marked thereon.

The invention relates to new and useful improvements in electro-mechanical movements, and more particularly an apparatus wherein increment of movements of one member are imparted to another member at a distance therefrom in the same order or direction.

An object of the invention is to provide an apparatus wherein a member movable back and forth in random order in response to a variable element electrically controls mechanically actuating devices at a distance therefrom whereby said devices cause another member to move back and forth in the same order or direction as said first member.

A further object of the invention is to provide an apparatus wherein a member movable back and forth in random order in response to a variable element electrically controls the actuation of a plurality of mechanically actuating devices in an order corresponding to the back and forth movement of said member, and wherein said mechanically actuating devices cause another member to move back and forth in the same order or direction as said first member.

A further object of the invention is to provide an apparatus of the above character wherein the mechanically actuating devices are controlled by local electric circuits through mechanically moved contacts tripped by an independent circuit in turn controlled by the movement of the member at a distance.

Still another object of the invention is to provide means for cutting out the long distance circuit immediately upon the tripping of the mechanically actuated devices for the contacts.

Still another object of the invention is to provide means for breaking the long distance circuit on the movement of a mechanically actuating device controlled thereby, and maintaining the same broken until the actuation of one of the other mechanical devices at which time said long distance circuit is re-established.

A still further object of the invention is to provide means whereby the actuation of a mechanical device resets the contact for said device and automatically breaks the local circuit when said mechanically actuated device has moved a predetermined distance.

Another object of the invention is to provide a device of the above character having a plurality of mechanically actuated devices controlled by a movable member at a distance, with means whereby when one of said mechanically actuated devices is tripped, and set into operation, the tripping devices for the remaining mechanically actuated devices are rendered inoperative until said mechanically actuated device set into operation completes its entire movement.

These and other objects will in part be obvious and will in part be hereinafter more fully disclosed.

In the drawings which show by way of illustration one embodiment of the invention—

Figure 1 is a side view of an apparatus embodying the invention, the casing being removed to show the inner parts;

Fig. 2 is a view of one end of the machine;

Fig. 3 is a view of the other end of the machine;

Fig. 4 is a transverse sectional view through the machine and showing the tripping devices and controlling means for initiating the operation of the mechanical means;

Fig. 5 is a transverse sectional view through the machine showing in part, the manner of controlling the long distance circuit;

Fig. 6 is an end view of the machine with the end plate removed to show the mechanically actuated devices for rotating the master shaft;

Fig. 7 is a transverse sectional view showing the electric clutches and the means for imparting movement to the intermittently actuated shafts;

Fig. 8 is a transverse sectional view showing the mechanism for controlling and actuating the trip when the same is released;

Fig. 9 is a longitudinal sectional view through the machine;

Fig. 10 is a perspective view of the tripping device;

Fig. 11 is a side view of one of the tripping devices and controlling lever actuated thereby;

Fig. 12 is a diagrammatic view showing the wiring of the long distance circuit and the control therefor;

Fig. 13 is a diagrammatic view showing the wiring for controlling the clutch circuits;

Fig. 14 is a diagrammatic view showing particularly the wiring for the motor operating circuit;

Fig. 15 is a view showing the trip mechanism with the parts set;

Fig. 16 is a similar view but showing the trip mechanism as released and the controlling lever moved thereby;

Fig. 17 is a view showing the trip device with the parts moved to a point near release for re-setting;

Fig. 18 is a similar view but showing the trip device released so as to be engaged by the sear of the trigger mechanism;

Fig. 19 is a view showing more or less diagrammatically the actuating mechanism for the trip lever with the parts in the position they assume after the trip lever is released, and Fig. 20 is a similar view, but showing the parts as moved to re-setting position.

The invention is directed broadly to an electro-mechanical movement which is especially adapted for imparting increments of movement from one member to another member at a distance therefrom in the same order or direction, as for example, the increments of movement of the pointer or indicator of a steam gauge. They may be imparted from the improved device to another member and will cause said member to move back and forth in the same order or direction as the indicator of the steam gauge, and the movements of the last-named member may be utilized for controlling the dampers or the like. The device includes a control or master shaft which is operated through small increments of movement in the manner just referred to, after which it stops. The increments of movement are added in the same direction as long as the steam is rising, but just as soon as the steam drops, then the increments of movement are imparted to the control shaft in the opposite direction. In the preferred form of the invention, this control shaft or master shaft is actuated by three cam slides, each of which is provided with a double cam adapted to engage spaced pins which in turn control the movements of the master shaft. These cams are mechanically actuated intermittently and are so located that if the slides are operated in succession in one direction or selection, the master shaft will turn in the direction of such successional movement. Just as soon, however, as the slides are operated in a reverse direction, then the shaft will turn in the reverse direction. These cam slides are operated by intermittently driven auxiliary shafts which are in turn rotated through one complete rotation by a driving shaft after which they stop. Electrically controlled trip devices are provided for initiating the operation of the auxiliary shafts in the order of movement of the indicator of the steam gauge. Means is also provided for re-setting the trip devices and automatically stopping the movements of the auxiliary shafts. A trip device is operated by an electric circuit which is known as a long distance circuit, and this is controlled by an indicator. The trip device actuates the control lever, there being one for each auxiliary shaft, and this control lever controls the circuit of an electric clutch, which clutches an auxiliary shaft up to the driving shaft and also controls a local circuit for starting a motor, if one be used for actuating the driving shaft.

The apparatus will now be described in detail as it will give a better understanding of the invention.

General structure.

The apparatus may be of any desired shaping or form, but I prefer to embody the same in a structure consisting of two end frame members 1 and 2 and a central frame member 3. Extending through all three members are a series of rods 4, 4 which are provided with heads 5. Mounted on the rods 4 are sleeves 6 against which nuts 7 bear for rigidly securing the rods to the end plate 1. On each rod there is a collar 8 which is secured to the rod by a set screw 9, and the outer end of each rod is reduced as indicated at 10, and on the end of the rod is a nut 11. On the reduced end of the rods are short spacing sleeves 12. A cover plate 13 is provided through which these rods extend, and the nuts 11 bear against the cover plate so that the nuts 11 not only hold the cover plate in place, but also aid in rigidly connecting the end frame 2 to the supporting rods. Mounted on the rods 4 are sleeve members 14 which extend through the central frame member 3 so that said central frame member is also supported on these rods. A casing may be provided which will be carried by the end members for the purpose of enclosing the mechanism. If desired, just as the means for supporting the end members, the device is shown as provided with supporting legs 15, 15 and 16, 16. Of course, any suitable means may be provided for supporting the device.

Mechanically actuated device.

The mechanically actuated device which is used for controlling the part to which increments of movement may be imparted, in the present form of the invention, consists of a shaft 17, which shaft is journaled at its left-hand end as viewed in Fig. 9, in a supporting plate 18. Said shaft also extends through the central frame member 3 and through the end frame member 2. On the end of this shaft, there is a disk 19. Spaced from the disk 19 is a second disk 20 to which is integrally attached a shaft 21. The disk 20 is secured to the disk 19 by pins 22. These pins are four in number as clearly shown in Fig. 6, and I have numbered them $22^a$, $22^b$, $22^c$ and $22^d$, respectively. The shaft 21 is in line with the shaft 17, and the shaft 17 is merely a supporting means for the shaft 21, so that the spaced pins may be provided, which pins serve in a sense as crank members whereby motion may be imparted to the shaft 21.

Secured to the end frame member 2 is a plate or disk 23 on which are mounted radially disposed guide bars 24, 24. There are three sets of guide bars 24, and they are arranged at angles of one hundred and twenty degrees apart. Of course, a greater number of guide bars may be provided, if desired. Sliding between these guide bars are cam plates 25. There are three cam plates, and I have lettered the same $25^a$, $25^b$, and $25^c$. These cam plates are all similar in construction. Each cam plate is provided with a triangular shaped end 26 in the vertex of the triangle projecting forward. These triangular projections serve as cams for engaging the crank pins 22 and thus imparting movement to the shaft 21. These cam plates slide radially between their guiding members and associated with each cam plate there is an auxiliary shaft 27. The shaft operating the cam plate $25^a$ is indicated at $27^a$. The shaft driving the cam plate $25^b$ is indicated at $27^b$ and the shaft driving the cam plate $25^c$ is indicated at $27^c$. These auxiliary shafts are all similar in construction. Each shaft on the end thereof carries a disk 28 shown in dotted lines in Fig. 6, and one of said disks is shown in full lines in Fig. 9. Mounted on said disk 28 is a crank pin 29 adapted to engage in a slot 30 extending at right angles to the longitudinal axis of the slide. This permits the shaft $27^a$ to rotate and as it rotates, it will move the cam plate radially of the end frame. In Fig. 6 it will be noted that the cam slide $25^b$ has moved forward, and the cam carried on the forward end thereof has passed between the pins $22^b$ and $22^c$. This gave to the shaft 21 a partial rotation. If now, the cam slide $25^a$ is moved forward, the cam end will engage the pin $22^a$ and will rotate the shaft 21 in a counterclockwise direction through a partial rotation. If the slide $25^c$ is moved forward instead of the slide $25^a$, it will engage the pin $22^d$ which will impart a rotation to the shaft 21 in a clockwise direction, giving thereto a partial rotation. It will readily be seen, therefore, that if these slides $25^a$, $25^b$ and $25^c$ are operated in succession, in a clockwise direction as viewed in Fig. 6, they will impart increments of movement to the shaft 21 in the same order, that is, in a clockwise direction. As soon, however, as the order of operation of the slides is reversed, to a counterclockwise direction, then the shaft 21 will be moved through increments of movement in a counterclockwise direction. It will be noted, therefore, that means is provided for mechanically moving the shaft 21 through increments of movement by the rotation of auxiliary shafts, each shaft moving through a complete rotation, and the increments of movement imparted to this master shaft 21 will depend upon the order in which the auxiliary shafts are operated. The shaft 21 is utilized for the purpose of moving any desired mechanism, even where considerable power is required to impart movement thereto. As for example, the control of dampers for a furnace or steam boiler, the control of a flume gate in connection with water power, or any other desired mechanism where it is an advantage to impart increments of movement thereto in a certain order determined by the movement of some other element. I have provided the cam plate with a slight depression 31, and a pin 32 carried by a spring member 33 yieldingly engages this depression when the slide is retracted.

While I have shown the cam slides as arranged radially of the shaft which they operate, it will be understood, of course, that they may be arranged in different relation, as for example, they may be placed parallel, in which case, of course, the device operated thereby and carrying the spaced pins would have to be slightly modified.

Intermittent driving means for auxiliary shafts.

The means for driving the auxiliary shafts are all similar in construction. Each auxiliary shaft is formed in two sections, one of which is rotated continually when the main driving shaft is actuated, and the other of which is connected up to the driven part by means of an electric clutch. Referring to Fig. 9 of the drawings, the section of the auxiliary shaft corresponding to the shaft section $27^c$ is indicated at 34. Said shaft 34 is mounted in part in the end frame 1 and in the disk 18. Said shaft 34 has an enlarged section 35 extending into the electric clutch. Surrounding this enlarged section 35 is an electric coil 36. Said section 35 is provided with a recess in which is housed a spring 37 and a ball bearing 38 therefor. Located between the end of the section 35 and the end of the shaft section 27ᶜ is a slidable member 39 provided with projecting pins 40 adapted to engage sockets 41 in said member 35. Said member 39 also has a recess adapted to engage the end of the shaft 27. The part 39 is connected with the armature 42, which armature slides freely on the shaft, but is held from angular movement on the shaft by means of pins 43 projecting from the collar 44 secured to the shaft section 27ᶜ by a set screw 45. It will readily be seen that when the coil 36 is energized, the armature 42 will move to the left as viewed in Fig. 9, which will cause the pins 40 to engage the sockets 41 and thus lock or clutch the shaft section 34 to the shaft section 27ᶜ, and therefore, any movement imparted to the shaft 34 will be imparted to the shaft section 27ᶜ. Each auxiliary shaft has a similar clutch and a similar connection, and a similar gear, and these gears 34ᵃ mesh with a gear 46 on the driving shaft 47. The driving shaft 47 may be provided with a pulley 48 and continuously driven by driving the same from the motor, or said shaft may be connected by suitable gear mechanism with a source of power. So far as the present invention is concerned, it is sufficient to merely consider that this shaft 21 is a driving shaft which is operated at least for a sufficient time to rotate the auxiliary shafts through one complete rotation when they are clutched up to the same.

*Electric control for motor and clutch.*

These clutches and the motor as well, when one is used, are both controlled by local circuits, and these local circuits are in turn controlled by a swinging control lever. The control lever for the auxiliary shaft 27ᵃ is indicated at 49. This lever 49 is mounted on one of the rods 4 and is free to swing thereon. A spring 50 encircles the rod 4 and is connected at one end to the fixed collar 8. The other end of this spring is connected to the lever 49 at 51. The rod 4 is provided with a spool or sleeve 52 for said spring 50. This lever 49 carries a metal spring plate 53 which is adapted at one end to bridge contacts 54 and at its other end to bridge a pair of contacts 55. It will be understood that there is a controlling lever for each auxiliary shaft. They are similarly constructed and the same reference letters have been applied thereto.

The wiring connections both for the clutches and the motor, are shown diagrammatically in Figures 13 and 14. In Fig. 13, the clutch control is shown. The lever 49 in this figure is shown as moved away from the contacts 54, 54. The lever 49ᵃ which is associated with the auxiliary shaft 27ᵇ is also moved away from the contacts 54ᵃ, 54ᵃ and the lever 49ᵇ associated with the auxiliary shaft 27ᶜ is likewise separated from the contacts 54ᵇ and 54ᵇ with which it is associated. It will readily be seen that upon a swinging of the levers in a direction opposed to the movement of the levers by the spring 50, will cause the levers to close the contacts 54, 54ᵃ and 54ᵇ, depending upon the selection of which lever is moved, and this in turn will cause the local circuit to energize one or the other of the electric clutches and connect an auxiliary shaft up to the driving shaft, and this will bring about actuation of one of the slides.

In this Fig. 13, I have shown the local circuit as a battery circuit indicated at B. The solenoid of the several electric clutches are indicated at 36. Each solenoid is connected to a line *e* which in turn is connected at one side of the battery and the other terminal of the solenoid is connected to one of the contacts 54. The battery is connected through a line *f* with the other contact 54, so that when the proper lever is moved, one or the other of these solenoids will be connected with the battery.

In Fig. 14, I have shown an arrangement whereby the motor may be used for operating the driving shaft, which motor is in turn operated by a local circuit which is connected up to the motor just long enough so that the motor will be operated to bring about one operation of the apparatus, after which the motor is cut off and the driving shaft stops rotating. In this figure, the control levers are similarly indicated, and the contacts 55, 55 for the lever 49 are adapted to be bridged by the metal plate associated therewith carried by the lever, and these contacts 55, 55 are connected up with the motor circuit. Here too, the battery is indicated at B. One of each pair of contacts 55 is connected to a line *h* and the other of each pair of contacts is connected to a line *i*. One terminal of the battery B is connected to the line *i* and the other terminal to the motor. The motor is also connected to the line *h*. It will readily be seen, therefore, that no matter which control lever is moved, it will close the motor circuit and start the motor, and the motor will continue to operate as long as the control lever stands in the position with the contacts 55 bridged by the metal plate carried by the control lever.

*Trip mechanism for control lever.*

As above noted, the control lever is moved in one direction by a spring. Said control levers are moved in the other direction by a trip device, and this trip device is in turn controlled by an armature or a solenoid which is adapted to be actuated by a long distance circuit connected with a variable element from which the control of the increments of movement of the apparatus is obtained. The trip device is indicated at 56 in the drawings. Said trip device is carried by a short shaft 57 mounted in the central frame 3 (see Fig. 9). On the opposite end of the shaft 57 is a segmental block 58 which is rigidly connected to the shaft 57 carrying the trip device 56. Said trip device 56 has a circumferential recess 59, the bottom of which is eccentric, and this recessed portion of the trip device is adapted to engage the portion 60 of the control lever 49. The trip device is so mounted that as is swings with the shaft 57, it will engage the lever 49 and move the same against the action of the spring 50 to the full line position shown in Fig. 11. This trip device is actuated by means of a spring (see Figures 8, 19 and 20). Pivotally secured to the segment block 58 is a link 61. Said link is secured to the segmental block at 62. A flexible cord 63 is secured to the outer end of said link 61, and this cord extends over a pulley 64 loosely mounted on one of the rods 4. The cord 63 also extends about a pulley 65 and is fixed to the central frame member 3. Coiled about said rod is a spring 67, one end of which is secured to the pulley 65 and the other end of which is secured to a collar 68 rigidly attached to the rod. It will readily be seen that this coiled spring 67 puts a strain on the flexible cord 63 and normally tends to turn the segment 58 to the position shown in full lines in Fig. 19. Further movement of this segment is prevented by means of a pin 69 secured to a disk 70 mounted in said central frame member 3.

When the parts are inactive, the trip lever is normally held by a sear 71 which is carried by an armature 72 associated with the control coil 73. This control coil will be explained more fully hereinafter and is connected up with a long distance circuit and is energized by a variably moved pointer or indicator. This armature 72 is mounted on an arm 74 pivoted at 75 to a plate 76. The plate 76 is adjustably mounted on the central frame member 3 and is held in adjusted position by a locking bolt 77. The purpose of adjusting this plate 76 is to move the sear toward or from the trip device so that a very delicate setting of the trip device may be had similar to that of a hair trigger of a gun, the purpose being to so construct and balance the devices, that a current of very small voltage may be utilized for releasing the trip device. As a matter of fact, I have been able to so balance the parts and regulate the hair trigger control that the armature may be released by a current of one volt or less capacity.

When the coil 73 is energized, the armature will be drawn toward the coil and this will release the trip device so that the spring will rotate the shaft 57 carrying said trip device. The trip device will engage the control lever 49 and move the same so as to establish a local circuit connection with the motor, if one is used, and the local circuit connection with the clutch associated with the particular control lever which is moved.

The trip device is re-set by means of a disk 78 which is rigidly secured to the auxiliary shaft 27ª. This disk 78 makes a complete rotation with the auxiliary shaft. The disk carries the lug 79. When the shaft is set into rotation, this lug comes into contact with the trip device and will turn the trip device in a clockwise direction until the same is brought back to a point where the sear may engage the trip device and lock it in set position for the next operation.

In Fig. 15 of the drawings, I have shown the trip device in set position ready for releasing. In Fig. 16, said trip device has been released and moved to a position for actuating the control lever. In Fig. 17, the lug on the disk 78 has moved into engagement with a trip device and has rotated the trip device in a clockwise direction until it has been brought back to a point so that the forward end thereof is in rear of the sear. This trip device has a rearwardly extending projection 80. Pivotally mounted on the pivot pin 75 is an arm 81 which is provided with a curved portion 82 and a laterally extending member 83. The spring 84 secured to said arm and the armature tends to move the lateral projection 83 toward the armature. The rearwardly extending projection 80 engages this lateral projection 83 when the trip device reaches the position shown in Fig. 17. The lug 79 is just about to release this trip device, but the continued movement thereof to point of release, moves the arm 81, placing the spring 84 under tension, so that the tension of the spring 84 performs two functions. First, it pulls the armature away from the coil and insures that the sear will be placed so as to engage the trip device, and second, it presses on the projection 80 and tends to move the trip device forward into engagement with the sear, to where said trip device has engaged the sear, then the projection 80 has released the laterally extending member 83 so that the spring 84 is released from tension and it no longer operates to hold the armature away from the coil. This spring 84 which assists in bringing the trip device and the sear into set engagement does not operate, however, to prevent the easy swinging of the armature by a slight pull of the energized coil and thus the release of the trip device.

Referring again to Figures 19 and 20, it will be noted that when the trip device is moved to a position so as to be engaged by the sear, the pivotal connection 62 of the link 61 will move to a point slightly beyond the line passing through the center of the shaft 57 and tangentially of the pulley 64 at the left thereof as viewed in Fig. 20. The result is that the tension on the flexible cord 63 at this position of the parts operates to turn the segmental block 58 in a counterclockwise direction instead of a clockwise direction. This action relieves the trip device from the excessive strain of the spring pull on the flexible cord 63 at the time when it is in engagement with the sear, and enables the use of a very slight pull, or as I have referred to above, a hair trigger-like operation for releasing the trip device.

As an auxiliary insurance that the trip device will be moved forward into contact with the sear, and held thereby, I have provided a swinging lever 85. Said lever is pivoted at 86 to the disk 70 and is spring pressed by means of a spring 87 in a clockwise direction. An adjustable screw 88 engaging a plate 89 limits the clockwise movement of this lever. The end 90 of the lever is engaged by the segment 58 when said segment is moved to the excessive position necessary for the lug 79 to release the trip device. This spring pressed lever cooperates with the spring 84 in moving the trip device forward into engagement with the sear, and the positioning of the link 61 so that when the trip device is released, the spring acting through the flexible cord 63 may quickly move the trip device forward to force the control lever into position for stopping the motor, energizing the clutch and connecting the auxiliary shaft associated therewith with the main driving shaft. The disk 78 is provided with a cut away portion 91 and the control lever 49 has a laterally extending lug 92. When the auxiliary shaft stops, this lug 92 is located in this cut away portion of the disk 78. The trip device moves the control lever and in turn moves the lug 92 out of this cut away portion in the disk 78. As soon as the disk begins to rotate with the movements of the auxiliary shaft, the control lever is held from movements toward the auxiliary shaft through the action of the spring bearing on the control lever by means of this lug 92 engaging the periphery of the disk 78 after the trip device has moved away from engagement with the control lever, and therefore, the control lever will be held positively in position where the contacts will close for connecting the cutch and motor until the auxiliary shaft has made a substantially complete rotation and the cut away portion 91 is again brought around to a point opposite the lug 92, so that when the auxiliary shaft rotates, the trip device is not only reset, but the control lever is released so as to break the circuits and automatically stop the auxiliary shaft after it has made substantially one complete rotation.

*Distance point control and coil cut out mechanism.*

As has already been noted, my improved apparatus is adapted to be controlled from a distant point. At said distant point there is an indicator of some kind which is responsive to a variable element. In Fig. 12 of the drawings, I have shown diagrammatically an indicator 93. Said indicator is provided with a pointer or indicating hand 94. As shown in the drawings, it is of the ordinary rotary type such as a steam gauge or an air pressure gauge. It may of course, be of any desired type wherein some movable element moves back and forth or up and down responsive to the variation, or some element, such as the expansion and contraction of gas or power demand, or air lever or the like. In said indicating device, there are a series of contacts $l$, $m$, and $n$. It will be noted that all of the contacts $m$ are connected together in series and the contacts $n$ are connected in another series, while the contacts $l$ are connected in a third series. Wires lead from these contacts $l$, $m$ and $n$ to the terminals 95, 96 and 97, respectively. The movable hand or pointer 94 is connected to the line 98 and this line is connected to a battery 99 known as the long distance source of securing supply. It will readily be seen that as the pointer moves one way or the other, it will make engagement with these contacts $l$, $m$ and $n$, and establish certain circuits through the apparatus. The contacts may be placed very close together or a considerable distance apart to suit the requirements. Whenever the pointer or hand moves from one contact to another then there is one of the control coils connected up so as to bring about the operation of one of the auxiliary shafts.

Mounted on the shaft 17 is a sleeve 100 which has inset therein four blocks of insulation 101, 102, 103 and 104. Associated with each control coil 73 is a contact member 105. There is one for each coil, and these contact members bear upon the sleeve 100. The contact member bearing on the insulation block 102 is associated with the coil controlling the auxiliary shaft $27^b$, while the contact between the blocks of insulation 103 and 104 controls the coil associated with the shaft $27^a$, and the other contact is associated with the coil controlling the auxiliary shaft $27^c$. The sleeve 100 is connected through a plate 106 to the return circuit. Referring again to Fig. 12, the circuits for the control coils of the apparatus will be made clear. The terminal 97 is connected with a line 107. This line 107 is connected with one of the terminals 108. The other terminal 108 is connected with the control coil 73 which in turn is connected with the contact member 105. The terminal 96 is connected through the line 109 with the contacts 110, and the other contact 110 is connected with the coil 73 associated therewith and this coil is also connected with the contact 105. The terminal 95 is connected with the line 111 which in turn is connected with a contact 112, and the other contact of the pair 112 is connected with the coil 73 which in turn is connected with the contact 105 associated therewith. On the control lever 49 there is a metal bridge piece 113 which is adapted to connect the pair of contacts 108. There is a similar metal bridge piece in the other contact levers which connect respectively the contacts 110 and the contacts 112, so that these contacts are normally bridged and the circuits are established from the terminals 95, 96 and 97 through three separate circuits in multiple with the contacts 105. Extending from the other terminal of the battery 99 is a line 114, and this line 114 is connected to pairs of contacts 115, 116 and 117. There is a bridge piece on each control lever for these pairs of contacts and when the control levers are in the positions shown in Fig. 12, these contacts 115, 116 and 117 are bridged. One of the contacts of the pair 117 is connected through the plate 106 with the sleeve 100. It will therefore, be seen that these pairs of contacts are connected in series with the sleeve 100.

Referring to Fig. 12, it is to be assumed that the hand or indicator 94 has moved on to the contact $l$. The circuit was established through the line 109 which energizes the coil associated therewith and this releases the trip lever, which in turn will move the control lever over to a point where the local circuit is established to the clutch and also to the motor. This movement of the control lever breaks the circuit through the line 114 leading to the contact 115, and also breaks the circuit through the line 109 leading to to the contacts 110. After the auxiliary shaft 27$^c$ has made one complete rotation and has actuated the shaft 21 through an increment of movement, then the control lever is released and the spring will return it to the position shown in Fig. 12 where the contacts 110 and 115 will be again bridged while the clutch and the motor are cut out. But during this rotation of the main shaft, the sleeve 100 has moved to a point so that the insulating block 101 is beneath the contact member 105 associated with the coil 73 that controls the movement of the shaft 27$^c$, so as long as the pointer remains on this contact $l$, the circuit cannot be re-established, and if it moves off from the contact $l$ a short distance or to a point adjacent the contacts $m$ or $n$ and then back again on to the contact $l$, it cannot re-establish the circuit. The circuit will remain broken until the shaft 17 carrying the sleeve 100 is again moved away one or the other. The shaft 17 is turned by the mechanically operated cams through a distance of thirty degrees. As a result, when the shaft is given a movement in a counterclockwise direction as viewed in Fig. 5, the contact associated in said figure with the block of insulation 102 will move to the line $x$, while the insulating block 103 will move on to the contact 105 at the right of said figure. The insulating block 101 will move thirty degrees nearer to the contact 105 at the left of said figure. These increments of movement of the shaft 17 were brought about through the rotation of the auxiliary shaft 27$^a$ and the block of insulation 103 is associated with the coil controlling this auxiliary shaft 27$^a$ so that said coil is cut out. Thus it will be seen that two coils are in circuit for operation while one coil is cut out, and either of these two coils which are in circuit may be actuated, but the one which is actuated next depends upon the movement of the hand or pointer 94. If the pointer should move to the contact $m$, then the coil associated with the auxiliary shaft 27$^a$ will be energized and said shaft released and actuated. If the pointer or indicator 94 should move to the contact $n$, then the coil associated with the auxiliary shaft 27$^b$ will be energized.

*Operation.*

It is not thought necessary to give very much more detail description of the operation, as it has been necessary to describe the operation considerably in detail in connection with the circuits and the control of the same. It will be noted, however, that as the pointer or indicator 94, which is shifted back and forth by the variable element which is to control the movement of the shaft 21, it moves from one contact to another, and as it moves to the various contacts in succession in one direction of movement, increments of movement will be imparted to the shaft 21 in the same direction, and if the pointer or indicator hand reverses its movement, and engages contacts in succession by the movement in the other direction, then increments of movement will be imparted to the shaft 21 in the other direction. It will also be noted that if the pointer or hand moves out of engagement with one contact, that the controlling apparatus will not be affected if the hand shall move back on to said contact, or by any slight movement of the hand, but only when it moves to and makes engagement with the next adjacent contact. Therefore, the device includes a member movable back and forth in random order in response to a variable element, and this random back and forth movement of said movable member electrically controls the actuation of a plurality of mechanically actuated devices in an order corresponding to the back and forth movement of said member, and these mechanically actuated devices cause the shaft to move back and forth in the same order or direction as the member controlled directly by the variable element.

It will also be noted that there are two distinct circuits, a long distance circuit, and this long distance circuit merely trips the device which actuates the controlling lever, and this trip device is so balanced and constructed as to have a hair trigger-like action so that the power utilized in this long distance circuit may be very small. The shifting of the control lever controls local circuits which operate the clutch and which operate the motor, when one is used. The auxiliary shafts during their rotation, not only accomplish the movement of the cams, to impart movement to the control shaft, but also re-set the trip mechanism and are automatically stopped when they have completed a rotation, cutting off the motor circuit and also the clutch circuit.

As my device is intended for general use, I have not described its application in detail to any particular use, but it will be apparent from what has been stated that it may be used anywhere that it is desired to impart increments of movement to a member back and forth corresponding to the movements of a member at a distance, which last-named member is controlled by a variable element.

It will be noted from the above that when the control lever is returned to initial position that one of the mechanically actuated devices has completed a movement, that the local circuit is cut off entirely from the apparatus, that is, the circuit of the electric clutch is broken and the circuit for the motor is broken so that the motor stops running. Inasmuch as the current necessary for operating the trip coil is very slight, I have practically cut off all operating expense between the intervals when it is desired that the apparatus should impart a movement to the master driven shaft. It will also be noted that when the device is in operation, the long distance circuit which initiates the movements of the mechanically actuated devices is broken, and therefore there is no flow of current in this circuit.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. An electro-mechanical movement comprising a movable member, mechanically actuated devices for intermittently moving said member, electrically controlled means for initiating the movement of said mechanically actuated devices, said electrically controlled means including a member movable back and forth in response to a variable for selectively operating the mechanically actuated devices, and means carried by the mechanically actuated devices for automatically cutting off the electrically controlled means when said mechanically actuated device has moved through a predetermined distance.

2. An electro-mechanical movement comprising a movable member, mechanically actuated devices for intermittently moving said member, electrically controlled means for initiating the movement of said mechanically actuated devices, said electrically controlled means including a member movable back and forth in response to a variable for selectively operating the mechanically actuated devices, and means moving with said movable member for cutting off the electrical control of the actuated mechanical device until another mechanically actuated device has been operated.

3. An electro-mechanical movement comprising a movable member, mechanically actuated devices for intermittently moving said member, each of said devices including a driven shaft, a cam member moved back and forth thereby, means associated with said movable member whereby said cam member cooperating therewith will intermittently move said member, electrically controlled means for initiating the movement of said mechanically actuated devices, said electrically controlled means including a member movable back and forth in response to a variable for selectively operating the mechanically actuated devices.

4. An electro-mechanical movement comprising a movable member, mechanically actuated devices, each including a driven shaft, a cam plate adapted to be reciprocated by each rotation of said shaft, said movable member having a series of spaced pins adapted to be engaged by the cam plates said cams and plates being disposed so that the selective operation of said cam plates will move said member one way or the other, electrically controlled means for initiating the movement of said mechanically actuated devices, said electrically controlled means including a member movable back and forth in response to a variable for selectively operating the mechanically actuated devices.

5. An electro-mechanical movement comprising a movable member, mechanically actuated devices for moving said member, each of said devices including a driven shaft, a crank on said driven shaft and a cam plate adapted to be reciprocated by the rotation of said shaft, said movable member having a series of spaced pins adapted to be engaged by the cam plates of the operating devices, said cams and pins being so disposed that by their selective operation, said movable member may be moved intermittently in one direction or the other, electrically controlled means for initiating the movement of said mechanically actuated devices, said electrically controlled means including a member movable back and forth in response to a variable for selectively operating the mechanically actuated devices.

6. An electro-mechanical movement comprising a movable member, mechanically actuated devices, a cam plate for each mechanically actuated device disposed radially about said movable member and uniformly spaced relatively thereto, each cam plate having a V-shaped cam at the inner end thereof, said movable member having spaced pins adapted to be engaged by the V-shaped cams, said pins being disposed so that selective operation of the cam plates will move said member intermittently in one direction on the other, electrically controlled means for initiating the movement of said mechanically actuated devices, said electrically controlled means including a member movable back and forth in response to a variable for selectively operating the mechanically actuated devices.

7. An electro-mechanical movement comprising a movable member, mechanically actuated devices for moving said member, each of said mechanically actuated devices including a driven shaft, a cam plate associated with the driven shaft and reciprocated thereby, means carried by the movable member whereby the actuation of the cam plates in selective order will move said member intermittently back and forth, a driving shaft for operating said driven shafts, an electric clutch for connecting the driven shaft with the driving shaft, electrically controlled means for initiating the movement of said mechanically actuated devices, said electrically controlled means including a member movable back and forth in response to a variable for selectively operating the mechanically actuated devices.

8. An electro-mechanical movement comprising a movable member, mechanically actuated devices for intermittently moving said member, electrically controlled means for initiating the movement of said mechanically actuated devices, said electrically controlled means including a control lever for each mechanically actuated device, a tripping device associated with each control lever, a trip coil for each tripping device, and a member movable back and forth in response to a variable for selectively energizing the trip coils.

9. An electro-mechanical movement comprising a movable member, mechanically actuated devices for intermittently moving said member, electrically controlled means for initiating the movement of said mechanically actuated devices, said electrically controlled means including a control lever for each mechanically actuated device, a spring actuated trip device associated with each control lever, a trip coil for each trip device, and a member movable back and forth in response to a variable for selectively energizing the trip coils.

10. An electro-mechanical movement comprising a movable member, mechanically actuated devices for intermittently moving said member, electrically controlled means for initiating the movement of said mechanically actuated devices, said electrically controlled means including a control lever for each mechanically actuated device, a trip coil for each control lever, a tripping device associated with each control lever, a trip coil for each tripping device, a member movable back and forth in response to a variable for selectively energizing the trip coils, and means operated by a movement of the mechanical device for re-setting the tripping mechanism.

11. An electro-mechanical movement comprising a movable member, mechanically actuated devices for intermittently moving said member, electrically controlled means for initiating the movement of said mechanically actuated devices, said electrically controlled means including a control lever for each mechanically actuated device, a spring actuated trip device associated with each control lever, a trip coil for each trip device, a member movable back and forth in response to a variable for selectively energizing the trip coils, and means operated by a mechanically actuated device for re-setting the trip device.

12. An electro-mechanical movement comprising a movable member, mechanically actuated devices for intermittently moving said member, electrically controlled means for initiating the movement of said mechanically actuated devices, said electrically controlled means including a control lever for each mechanically actuated device, a spring actuated trip device associated therewith, a trip coil for each trip device, a swinging armature carrying a sear for holding the trip device from movement, and a member movable back and forth in response to a variable for selectively energizing the trip coils.

13. An electro-mechanical movement comprising a movable member, mechanically actuated devices for intermittently moving said member, electrically controlled means for initiating the movement of said mechanically actuated devices, said electrically controlled means including a control lever for each mechanically actuated device, a spring actuated trip device associated therewith, a trip coil for each trip device, a swinging armature carrying a sear for holding the trip device from movement, a member movable back and forth in response to a variable for selectively energizing the trip coils, and means operated by the first-named movable member for cutting off the circuit of the actuated trip coil until another trip coil has been operated.

14. An electro-mechanical movement comprising a movable member, mechanically actuated devices for intermittently moving said member, electrically controlled means for initiating the movement of said mechanically actuated devices, said electrically controlled means including a spring actuated control lever for each mechanically actuated device, a spring actuated trip device associated with each control lever, a trip coil for each trip device, a swinging armature having a sear for oscillating the trip lever against the action of its spring, a member movable back and forth in response to a variable for selectively energizing the trip coils, a driving shaft for operating the mechanically actuated devices, and an electric clutch for connecting the driving shaft to the respective mechanically actuated devices, said control lever operating when moved to establish a circuit for the electric clutch.

15. An electro-mechanical movement comprising a movable member, mechanically actuated devices for intermittently moving said member, electrically controlled means for initiating the movement of said mechanically actuated devices, said electrically controlled means including a spring actuated control lever for each mechanically actuated device, a spring actuated trip device associated with each control lever, a trip coil for each trip device, a swinging armature having a sear for oscillating the trip lever against the action of its spring, a member movable back and forth in response to a variable for selectively energizing the trip coils, a driving shaft for operating the mechanically actuated devices, an electric clutch for connecting the driving shaft to the respective mechanically actuated devices, said control lever operating when moved to establish a circuit for the electric clutch, and a motor for operating the driving shaft, said control lever when actuated operating to establish a circuit for the motor.

16. An electro-mechanical movement comprising a movable member, a mechanically actuated device for intermittently moving said member, electrically controlled means for initiating the movement of said mechanically actuated device, said electrically controlled means including a control lever, a trip device for actuating the control lever, a trip coil, an armature for the trip coil, a sear on the armature for holding the trip device and means for energizing the trip coil.

17. An electro-mechanical movement comprising a movable member, a mechanically actuated device for intermittently moving said member, electrically controlled means for initiating the movement of said mechanically actuated device, said electrically controlled means including a spring actuated control lever, a spring actuated trip device, a control coil for the trip device, an armature for the coil, a sear carried by the armature adapted to engage the trip device, said spring actuating means for the trip device being constructed so that the tension of the spring on the trip device tending to move the same is at a minimum when said trip device is in engagement with the sear whereby the energy necessary to release the trip device may be reduced to a minimum, and means for energizing the trip coil.

18. An electro-mechanical movement comprising a movable shaft, a series of auxiliary shafts and devices associated with each shaft whereby said auxiliary shafts may impart intermittent back and forth movement to said movable shaft, an electric clutch for each auxiliary shaft whereby the same may be connected to a driving shaft, a spring actuated control lever for each shaft for controlling the circuit of the electric clutch therefor, a spring actuated trip device associated with each control lever, a trip coil for each trip device, an armature for each coil having a sear for holding the trip device from movement, means for selectively energizing the trip coils, and means carried by the auxiliary shafts for re-setting the trip device and releasing the controlling lever for automatically stopping the auxiliary shafts.

19. An electro-mechanical movement comprising a movable member, mechanically actuated devices for intermittently moving said member back and forth, a driving shaft, electric clutches for connecting said mechanically actuated devices to said driving shaft, a control lever for connecting said electric clutches to a local circuit, electrically controlled means for moving the control lever to establish the clutch circuit including a member, at a distance, movable back and forth in response to a variable and controlling a circuit separate from the local circuit.

20. An electro-mechanical movement comprising a movable member, mechanically actuated devices for intermittently moving said member back and forth, a driving shaft, electric clutches for connecting said mechanically actuated devices to said driving shaft, a control lever for connecting said electric clutches to a local circuit, electrically controlled means for moving the control lever to establish the clutch circuit including a member, at a distance, movable back and forth in response to a variable and controlling a circuit separate from the local circuit, and means for moving said control lever to break the clutch circuit when the mechanically actuated devices have moved through a predetermined distance.

21. An electro-mechanical movement comprising a movable member, mechanically actuated devices for intermittently moving said member back and forth, a driving shaft, electric clutches for connecting said mechanically actuated devices to said driving shaft, a control lever for connecting said electric clutches to a local circuit, a spring for normally holding the lever with the clutch circuit interrupted, electrically controlled means for moving the control lever to establish the clutch circuit including a member, at a distance, movable back and forth in response to a variable and controlling a circuit separate from the local circuit, and means for moving said control lever to break the clutch circuit when the mechanically actuated devices have moved through a predetermined distance.

In testimony whereof, I affix my signature.

CHARLES F. HUTCHINSON.